(12) United States Patent
Versluys et al.

(10) Patent No.: US 10,005,239 B2
(45) Date of Patent: Jun. 26, 2018

(54) SUPPORT STRUCTURES FOR ADDITIVE MANUFACTURING TECHNIQUES

(71) Applicant: Delavan Inc, West Des Moines, IA (US)

(72) Inventors: Kiley J. Versluys, Hartford, CT (US); Sergey Mironets, Charlotte, NC (US)

(73) Assignee: Delavan Inc., West Des Moines, IA (US)

( * ) Notice: Subject to any disclaimer, the term of this patent is extended or adjusted under 35 U.S.C. 154(b) by 161 days.

(21) Appl. No.: 14/812,762

(22) Filed: Jul. 29, 2015

(65) Prior Publication Data

US 2017/0028651 A1    Feb. 2, 2017

(51) Int. Cl.
| | |
|---|---|
| *B29C 67/00* | (2017.01) |
| *B23K 37/04* | (2006.01) |
| *B29C 64/153* | (2017.01) |
| *B29C 64/40* | (2017.01) |
| *B33Y 40/00* | (2015.01) |

(52) U.S. Cl.
CPC .......... *B29C 67/0092* (2013.01); *B23K 37/04* (2013.01); *B29C 64/153* (2017.08); *B29C 64/40* (2017.08); *B33Y 40/00* (2014.12); *Y10T 29/49817* (2015.01)

(58) Field of Classification Search
CPC . B29C 67/0092; B29C 67/0077; B23K 37/04; Y10T 29/49817; B33Y 40/00
See application file for complete search history.

(56) References Cited

U.S. PATENT DOCUMENTS

| | | | |
|---|---|---|---|
| 8,287,794 | B2 | 10/2012 | Pax et al. |
| 8,994,592 | B2 | 3/2015 | Scott et al. |

| | | | | |
|---|---|---|---|---|
| 2012/0295124 | A1 | 11/2012 | Schuster | |
| 2016/0279705 | A1* | 9/2016 | Mironets | ............. B29C 67/0077 |
| 2016/0325503 | A1* | 11/2016 | Mironets | ............. B29C 67/0077 |

FOREIGN PATENT DOCUMENTS

| | | |
|---|---|---|
| WO | WO-2015007966 A1 | 1/2015 |
| WO | WO-2016102876 A1 | 6/2016 |

OTHER PUBLICATIONS

Article Identified in Science Direct Search alert: Additive Manufacturing, "In Situ Formation of Substrate Release Mechanisms for Gas Metal Arc Weld Metal 3-D Printing" by Amberlee S. Haselhuhn, Bas Wijnen, Gerald C. Anzalone, Paul G. Sanders, Joshua M. Pearce.
European Search Report received from Intellectual Property Office (IPO) dated Feb. 8, 2017 for Application No. GB1613137.7.
3D printing & Additive Manufacturing, 1(4):204-209 (2014), Haselhuhn et al, "Substrate Release Mechanisms for gas metal arc weld 3-D Aluminium metal printing" 3D printing & Additive Manufacturing, 1(4):204-209 (2014), Haselhuhn et al, Substrate Release Mechanisms for gas metal arc weld 3-D Aluminium.

* cited by examiner

*Primary Examiner* — John C Hong

(74) *Attorney, Agent, or Firm* — Locke Lord LLP; Scott D. Wofsy; Christopher J. Cillié

(57) ABSTRACT

A support structure for an additive manufacturing system includes a support body with a support body material and an interface disposed on the support body with an interface material. The interface material has a ductile-to-brittle transition temperature that is higher than the ductile-to-brittle temperature of the support body material for selectively fracturing the interface material to separate an additively manufactured article from the support body.

15 Claims, 5 Drawing Sheets

SUPPORT STRUCTURES FOR ADDITIVE MANUFACTURING TECHNIQUES

BACKGROUND OF THE INVENTION

1. Field of the Invention

The present disclosure relates to additive manufacturing techniques, and more particularly to build plates for additive manufacturing techniques like powder bed fusion.

2. Description of Related Art

Additive manufacturing techniques such as stereo lithography and powder bed fusion are commonly used to produce three-dimensional articles. Stereo lithography generally involves curing polymeric resins to form a designed shape. Powder consolidation typically involves a layer-by-layer consolidation of power using a focused energy beam such as a laser beam or an electron beam. Powder consolidation generally occurs by depositing a relatively thin layer of powder in the build area of a powder fusion apparatus. The focused energy beam is scanned across portions of the powder layer that correspond to a cross-section of the three-dimensional article being constructed. The focused energy beam consolidates the powder in the area scanned by the focused energy beam, consolidating the powder with underlying structure—typically by sintering or by fusion. Once fused the structure is displaced, generally by displacing a build platform, and additional powder disposed over the newly formed layer such that a successive layer may be consolidated with the newly formed layer. Once the final layer is fused to the underlying structure, the article is separated from the build platform. Removal of the article from the build platform may include filing, sawing, milling, spark discharge or other process, after which the build platform may be reworked for reuse in fabrication of a successive article.

Such conventional systems and methods of have generally been considered satisfactory for their intended purpose. However, there is still a need in the art for improved articles and methods of making articles. The present disclosure provides a solution for this need.

SUMMARY OF THE INVENTION

A support structure for an additive manufacturing system includes a support body with a support body material and an interface disposed on the support body with an interface material. The interface material has a ductile-to-brittle transition temperature that is higher than the ductile-to-brittle temperature of the support body material for selectively fracturing the interface to separate an additively manufactured article from the support body.

In certain embodiments, the article includes a plurality of layers fused to one another using a selective laser sintering process, an electron beam melting process, or an electron beam sintering process. One of the plurality of layers can be fused to the interface layer and thereby be coupled to the support body. The support body material can have a ductile-to-brittle temperature that is below the ductile-to-brittle temperature of the interface material. A material included in the article can have a ductile-to-brittle temperature that is below the ductile-to-brittle temperature of the interface material. The support body material and article material can both have ductile-to-brittle temperatures that are below the ductile-to-brittle temperature of the interface material.

In accordance with certain embodiments, the interface material can have a resistance that is less than the resistance of the support body and/or an article coupled to the support body by the interface layer. A source lead can be connected to the interface layer. The source lead can couple the interface layer to a voltage source terminal for flowing current through the interface layer to resistively heat the interface layer. The support body and/or the article can be connected to a voltage return terminal. A drain lead can be connected to the interface layer for connecting the source lead and interface layer to the voltage return terminal. It is contemplated that interface layer, source lead, and drain lead can form a resistive heating element.

It is also contemplated that, in accordance with certain embodiments, that the interface layer can include an embrittlement component. The embrittlement component can be an inclusion, such as a particulate added to the interface material as the interface material is deposited on the support body. The embrittlement material can be a precipitate developed at grain boundaries within the crystalline structure of the interface material. In an exemplary embodiment, the embrittlement component includes at least one of oxygen, nitrogen, sulfur, and phosphorous. In another exemplary embodiment, the embrittlement component includes iron-nitride disposed at grain boundaries of a nitrogen-rich carbon steel material included in the interface material. It is also contemplated that the embrittlement component can be one or more of an impurity, a non-metallic inclusion, or an intermetallic constituent introduced into the interface material.

A method of separating an article manufactured using an additive manufacturing technique from a support structure includes heating an interface layer coupling the article to the support structure and cooling the interface layer such that the interface layer fractures. The article is constructed by the addition of successive layers to the support structure, such as by welding, fusion, or any other high density energy source. Cooling the interface layer includes cooling the interface layer to a temperature that is below the ductile-to-brittle transition temperature of the material forming the interface layer.

In embodiments, cooling the interface layer can include quenching the interface layer, such as with an air quench or by immersion in a liquid nitrogen bath. Cooling the interface layer can include cooling the article, the interface layer, and the support structure. Heating the interface layer can include flowing electric current through the interface layer, thereby resistively heating the interface layer. The method can also include introducing an embrittlement constituent into the interface layer, such as by causing precipitate to form at grain boundaries of the interface material crystalline structure or by including inclusions in the interface layer when initially deposited on the support structure. In an exemplary embodiment iron-nitride precipitate forms at grain boundaries within the interface layer material during the heating operation.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
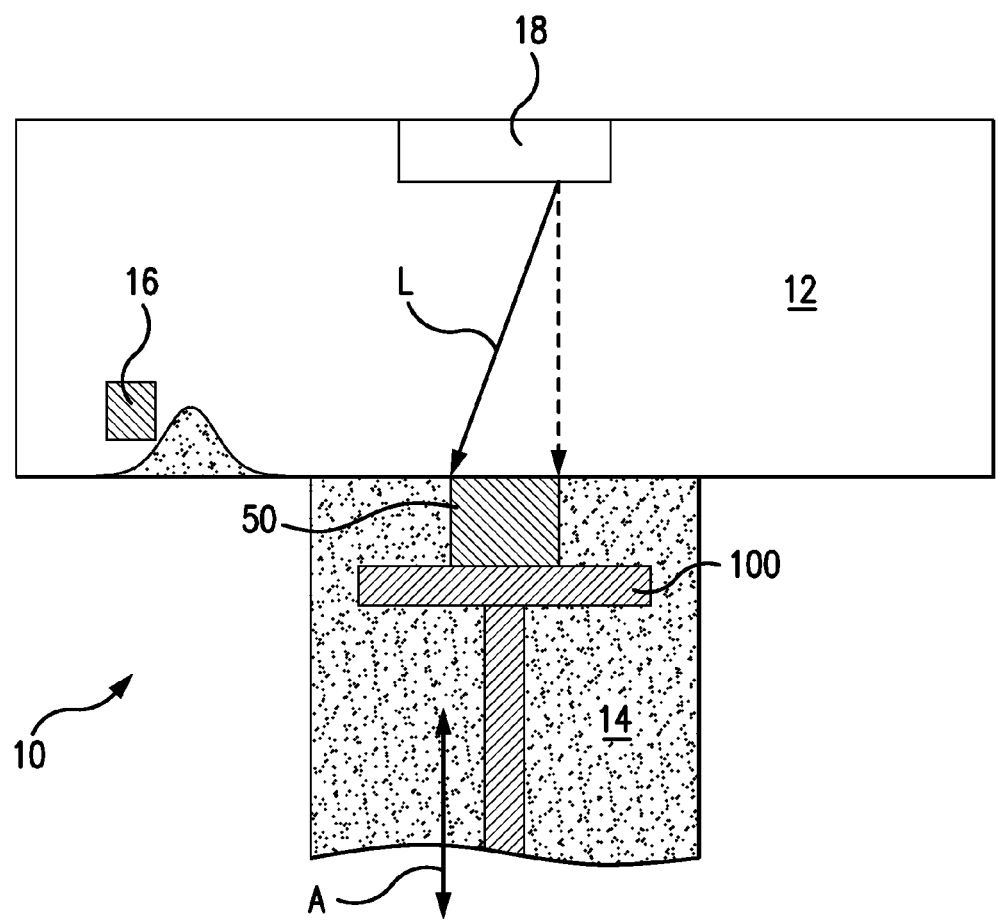
FIG. 1 is a schematic view of an exemplary embodiment of an additive manufacturing apparatus constructed in accordance with the present disclosure, showing a support structure.

Reference will now be made to the drawings wherein like reference numerals identify similar structural features or aspects of the subject disclosure. For purposes of explanation and illustration, and not limitation, a partial view of an exemplary embodiment of an additive manufacturing apparatus in accordance with the disclosure is shown in FIG. 1 and is designated generally by reference character 100. Other embodiments of additive manufacturing apparatus, support structures for additive manufacturing apparatus, and methods of separating additively manufactured articles from support structures in accordance with the disclosure, or aspects thereof, are provided in FIGS. 2-5, as will be described. The systems and methods described herein can be used for making articles by the layer wise addition of layers to a substrate, such as for fuel injectors for gas turbine engines.

Referring to FIG. 1, an additive manufacturing apparatus 10 is shown. Additive manufacturing apparatus 10 generally includes a build chamber 12, a powder bed 14, a powder charger 16, and a laser system 18. A support structure 100 is disposed within powder bed 14 is displaceable relative to build chamber 12, upwards and downwards relative to the drawing figure as indicated with arrow A. Laser system 18 is configured for scanning a laser beam L over a surface of powder bed 14. Powder bed 14 includes a particulate material which laser beam L fused as it scans over the surface of powder bed 14. This develops an article 50 by selectively fusing layers over top one another, developing article 50 layer wise by adding successive layers. Between scanning operations support structure 100 is withdrawn into powder bed 14, e.g. downwards, and powder charger 16 tops up powder bed 14 with additional particulate material. As will be appreciated, one or more of the initial layers of such articles may be fused to the support structure. Removal of such articles may therefore include sawing or electrical discharge machining to remove the article from the support structure. After removal, the surface of the support structure may also require refinishing in preparation for reuse. Refinishing can include milling or polishing the surface to restore the uniformity of the surface, for example.

Figure 2:
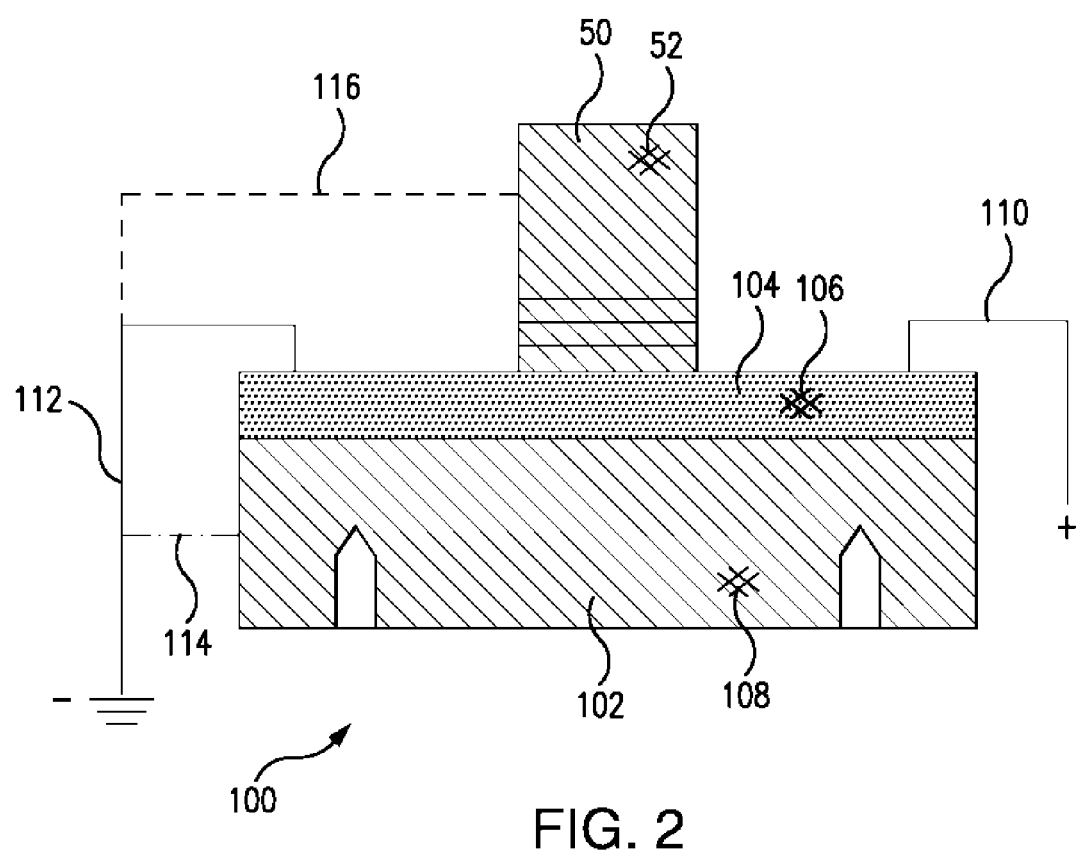
FIG. 2 is a schematic view of an embodiment of the support structure of FIG. 1, showing an interface layer on the support structure connected to a voltage source and voltage return.

With reference to FIG. 2, support structure 100 and article 50 are shown. Support structure 100 includes a support body 102. Support body 102 may include one or more features for removable fixing support structure 100 within an additive manufacturing apparatus, e.g. additive manufacturing apparatus 10 (shown in FIG. 1), and may be one of a group of support structure dedicated to a given apparatus to support successively manufacturing various articles. An interface layer 104 couples article 50 to support body 102 and renders support body 102, interface layer 104, and article 50 integral with one another while article 50 is constructed layer wise (i.e. upwards relative to support body 102) by fusing successive layers over one another.

Article 50 includes an article material 52 formed by the fusing of particulate feedstock (shown in FIG. 1). Interface layer 104 includes an interface material 106 that is different from article material 52. Support body 102 includes a support body material 108 that is different from interface material 106. The ductile-to-brittle transition temperature range is material dependent. For plain carbon steel, for example, the ductile-to-brittle transition is mismatched and separated, for example, by more than 170 degrees, i.e., between 200 degrees Celsius and 370 degrees Celsius. In this respect interface material 106 has a ductile-to-brittle temperature that is greater than a ductile-to-brittle temperature of support body material 108. Because the ductile-to-brittle temperatures of the respective materials forming interface layer 104 and support body 102 are different, support structure 100 can be cooled to a predetermined temperature that is both below the ductile-to-brittle temperature of interface material 106 and above the ductile-to brittle temperature of support body material 108, rendering interface layer 104 frangible and facilitating fracture of interface layer 104 without fracturing support body 102. As will be appreciated, once interface layer 104 is fractured article 50 can be readily separated from support body 102. It is contemplated that article material 52 have a ductile-to-brittle temperature that is below that of the ductile-to-brittle temperature of interface layer 106. This restricts fracture to interface layer 104, and allows for separation of article 50 from support structure 100 intact, without damage, and reducing (or eliminating) the need for further machining operations.

Interface material 106, support body material 108, and article material 52 have different electrical resistances. It is contemplated that the electrical resistance of interface material 106 can be lower than the resistance of either or both of support body material 108 and article material 52. This allows for rendering interface layer 104 frangible subsequent to developing article 50.

As illustrated in FIG. 2, a source lead 110 and a return lead 112 are both connected to interface layer 104. Source lead 110 is connected to a source voltage terminal and return lead 112 is connected to a return terminal. In this respect source lead 110, interface layer 104, and return lead 112 form a resistive heating element that, upon application of voltage, heats in response to current flow through interface layer 104. Heating of interface layer 104 above a predetermined temperature can change the ductile-to-brittle temperature of interface material 106, rendering the material more amenable to facture.

Figure 3:
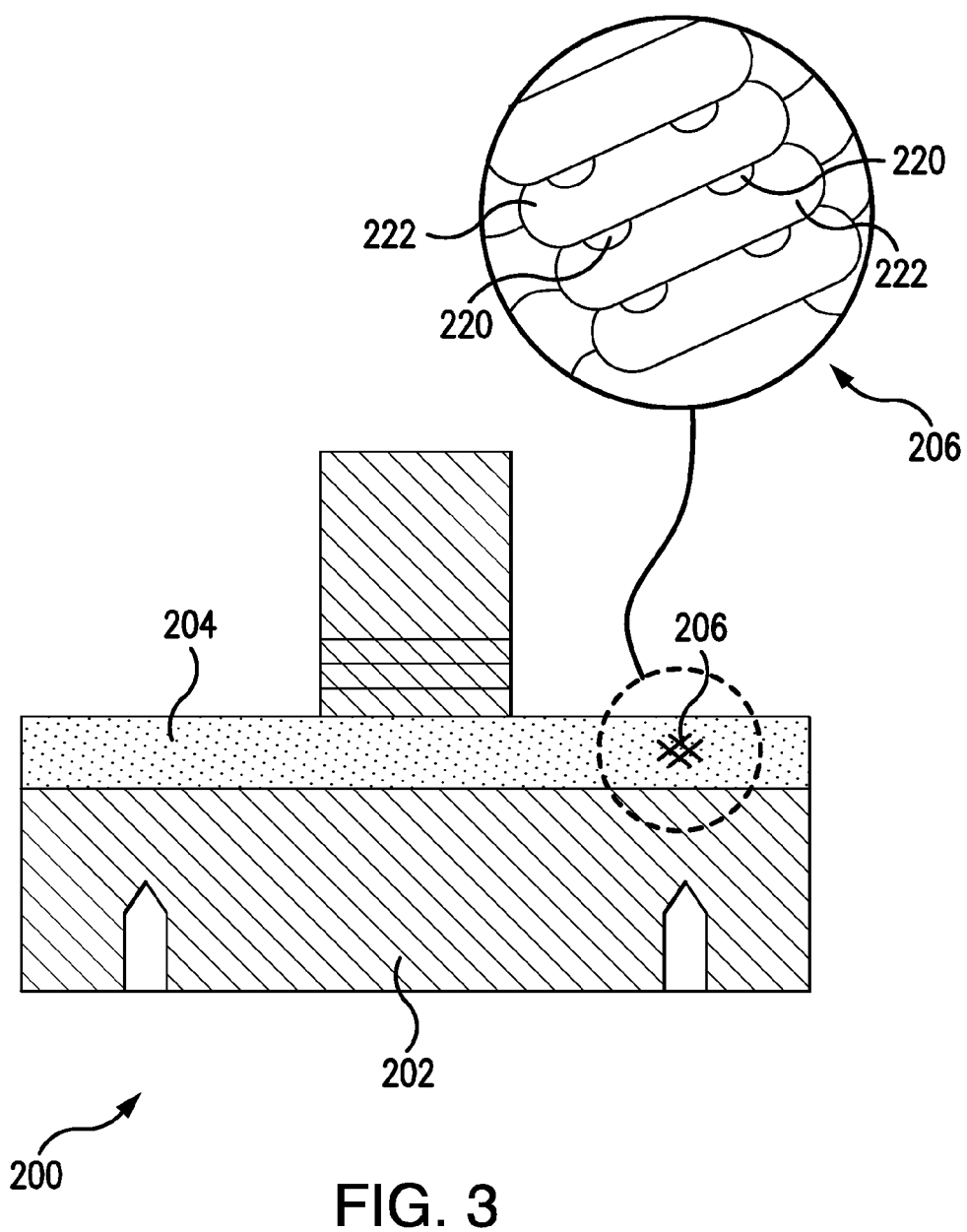
FIG. 3 is a schematic view of another embodiment of the support structure of FIG. 1, showing an interface layer on the support structure having inclusions.

For example, in an exemplary embodiment a support structure 200 shown in FIG. 3, an interface material 206 may include carbon steel with a high nitrogen content. The predetermined temperature associated with heating interface layer 204 may be above the bluing temperate of the high nitrogen content steel included in the material. This causes precipitates 220 to develop at boundaries between adjacent grains 222 within a crystalline structure of interface material 206 (shown in the magnification of interface layer 204). As will be appreciated, the precipitates form local stress concentration features within the material that facilitate fracture of the material. Because the precipitates can be form throughout interface material 206, interface layer 204 can be rendered frangible throughout the layer disposed on support body 202. This simplifies removing interface layer 204 completely, such as with a chisel instead of sawing or machining operation. In the illustrated exemplary embodiment shown in FIG. 3, precipitates 220 include iron-nitride.

Figure 4:
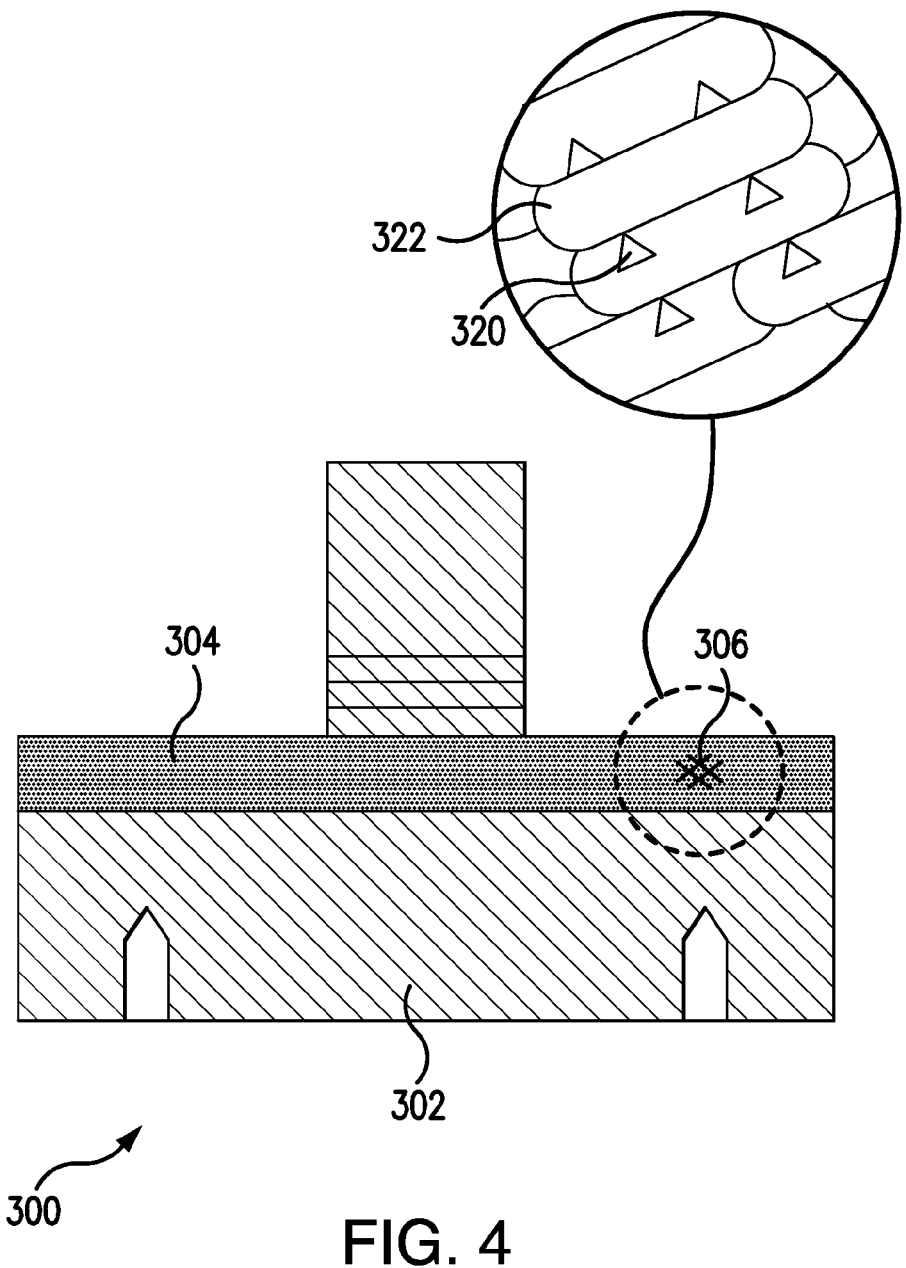
FIG. 4 is a schematic view of yet another embodiment of the support structure of FIG. 1, showing a crystalline microstructure of the interface layer.

With reference to FIG. 4, a support structure 300 is shown. Support structure 300 is similar to support structure 100, and additionally include an interface layer 304 with an interface layer material 306 having inclusions 320. Inclusions 320 are distributed throughout the crystalline structure of interface layer 306, both within individual grains 322 and between individual grains 322. It is contemplated that inclusions 320 include materials like an impurity, a non-metallic inclusion, or an intermetallic constituent intentionally added to interface layer 306 when developed on support structure 302.

Figure 5:
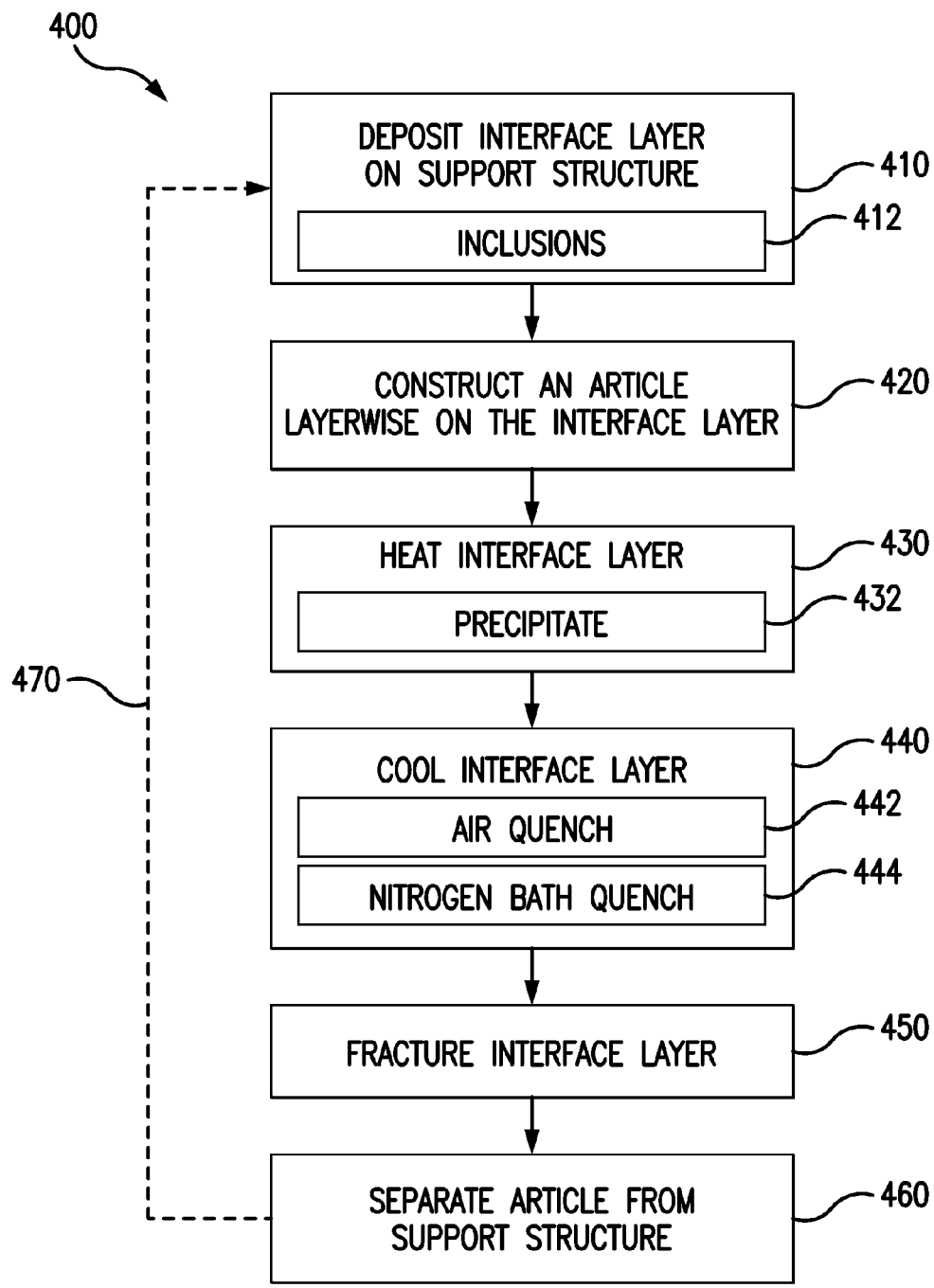
FIG. 5 is a flow diagram of a method separating an additively manufactured article from a support structure.

With reference to FIG. 5, a method of separating an article manufactured using an additive manufacturing technique from a support structure is generally referred to with reference numeral 400. The article, e.g. article 50 (shown in FIG. 2), is constructed by the addition of successive layers to the support structure, such as by welding, fusion, or any other high-density energy source. Once the article has been developed, an interface layer coupling the article to the support structure, e.g. interface layer 104 (shown in FIG. 2), is heated, as shown with box 430. Heating the layer can include resistively heating the interface layer by flowing current from a source terminal through a source lead, e.g. source lead 110 (shown in FIG. 2), through the interface layer and to a return terminal. The return terminal can be connected to the interface layer through a return lead, e.g. return lead 112 (shown in FIG. 2), or through one or more leads connected to the support body and/or article.

The method can also include introducing an embrittlement constituent into the interface layer. For example, heating the interface layer can include disposing a precipitate, e.g. precipitate 220 (shown in FIG. 3), at grain boundaries within the crystalline structure of the interface layer as shown by box 432. Alternatively or additionally, inclusions, e.g. inclusions 320 (shown in FIG. 4) can be deliberately incorporated into the interface layer and throughout the interface layer crystalline microstructure in conjunction with deposition of the interface layer on the support body, as shown with box 412.

Once the interface layer has been heated, the interface layer is cooled, as shown with box 440. Cooling the article can include quenching the interface layer, such as with an air quench, shown with box 442, or by immersion in a nitrogen bath, shown with box 444. Cooling the interface layer includes cooling the interface layer to a temperature that is below the ductile-to-brittle transition temperature of the material forming the interface layer. This renders the interface layer frangible throughout, allowing for fracturing the interface layer, as shown with box 450. The article may thereafter be separated from a support body, e.g. support body 102 (shown in FIG. 2), of the support structure.

Traditional additive manufacturing techniques fuse successive layers of powder to one another while developing an article. The initial layer(s) of the article fuse to an underlying substrate, and subsequent layers are fused on the predecessor layer(s). Once a desired number of layers have been added to form the article, the article is separated from the substrate. Separation is generally accomplished by sawing or electrical discharge machining the article from the substrate. The substrate generally must be reworked to restore the surface of the substrate prior to developing a subsequent article on the substrate.

In embodiments described herein, a frangible interface layer couples the article to the build platform. Rapid heating and cooling of the interface layer renders the layer frangible by facilitating rapid crack propagation throughout the interface the interface layer, allowing separation of the article from the build platform. Rapid heating and cooling of the interface layer, for example substantially the entire interface layer, facilitates reuse of the underlying support body by uniformly facilitating crack propagation throughout the layer. In certain embodiments the interface layer may be applied as a coating to the build platform. The coating may be amenable to welding and/or fusion, and can become integral with both the underlying support body and the overlying fused powder layer. Once the article is developed on the interface layer, an electric current can be applied to the coating to bring the material forming the coating about the material critical temperature, and the coating thereafter cooled or quenched to break or dissipate the coating between the article and the support structure, thereby liberating the article from the support structure. Submersion within a liquid nitrogen bath is contemplated.

In exemplary illustrative embodiments the interface can include carbon steel or alloy steel with an embrittlement constituent. The embrittlement constituent can be oxygen, nitrogen, sulfur, phosphorous or any other suitable that renders the carbon or alloy steel brittle. In accordance with certain embodiments, the embrittlement constituent can be a nonmetallic inclusion an intermetallic compound, or other impurity constituent that forms or precipitates at grain boundaries of the crystalline structure of the interface material. The embrittlement constituent enables catastrophic failure of a joint formed by the interface layer coupling the support body to the article during rapid heating and cooling (e.g. quenching) of the support body, interface layer, and article. This can reduce (or eliminate) the need to separate each using a machining operation, reduce the need to remove material from the article subsequent to separation, and simplify preparation of the support structure for development of a subsequent article.

The methods and systems of the present disclosure, as described above and shown in the drawings, provide for additive manufacturing systems and methods with superior properties including improved cycle time. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A support structure, comprising:
   a support body including a support body material; and
   an interface layer disposed over the support body and including an interface material,
   wherein the interface material has a ductile-brittle transition temperature that is higher than a ductile-brittle transition temperature of the support body material for separating three-dimensional articles formed on the interface material.

2. The support structure as recited in claim 1, wherein the article includes a plurality of layers fused over top one another using a selective laser sintering process, an electron beam melting process, or an electron beam sintering process.

3. The support structure as recited in claim 1, wherein the interface material has a resistance that is lower than a resistance of the support body material.

4. The support structure as recited in claim 3, further including an article coupled to the interface layer with a resistance that is less than the resistance of the interface material.

5. The support structure as recited in claim 1, further including source and drain leads connected to the interface layer.

6. The support structure as recited in claim 5, wherein the source lead, the interface layer, and the drain lead form a resistive heating element.

7. The support structure as recited in claim 1, further including an article coupled to the support structure by the interface layer, wherein the article has a ductile-to-brittle transition temperature lower than the ductile-to-brittle transition temperature of the interface material.

8. The support structure as recited in claim 1, wherein the interface material includes carbon steel with an embrittlement constituent added to promote fracture of the interface layer.

9. The support structure as recited in claim 8, wherein the embrittlement component at least one of oxygen, nitrogen, sulfur, and phosphorous.

10. The support structure as recited in claim 8, wherein the embrittlement constituent includes a precipitate disposed at grain boundaries within a crystalline structure of the interface material.

11. The support structure as recited in claim 8, wherein the embrittlement constituent includes at least one of an impurity, a non-metallic inclusion, and an intermetallic constituent.

12. The support structure as recited in claim 8, wherein the embrittlement constituent includes an iron-nitride precipitate.

13. A method of separating an additively manufactured article from a support structure including a support body with a support body material, the method comprising:
    heating an interface layer coupling an article constructed by layer wise addition of layers on the interface layer, wherein the interface layer is disposed over the support body and includes an interface material,
    wherein the interface material has a ductile-brittle transition temperature that is higher than a ductile-brittle transition temperature of the support body material; and
    cooling the interface layer such that the interface layer fractures, wherein cooling the interface layer includes cooling the interface layer to a temperature that is below the ductile-to brittle transition temperature of a material forming the interface layer.

14. The method as recited in claim 13, wherein cooling the interface layer includes cooling the interface layer to a temperature that is (a) above a ductile-to-brittle transition temperature of a material included in the support structure, and (b) above a ductile-to-brittle transition temperature of a material included in the article.

15. The method as recited in claim 13, wherein heating the interface layer includes resistively heating the interface layer to a temperature that is above the blue brittleness temperature of a material forming the interface layer.

* * * * *